(12) United States Patent
Atra et al.

(10) Patent No.: US 7,274,154 B2
(45) Date of Patent: Sep. 25, 2007

(54) CFL BALLAST WITH PASSIVE VALLEY FILL AND CREST FACTOR CONTROL

(75) Inventors: Chandrashekara Atra, Bangalore (IN); Cecilia Contenti, Hermosa Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 150 days.

(21) Appl. No.: 11/059,253

(22) Filed: Feb. 16, 2005

(65) Prior Publication Data

US 2005/0184679 A1    Aug. 25, 2005

Related U.S. Application Data

(60) Provisional application No. 60/546,515, filed on Feb. 19, 2004.

(51) Int. Cl.
*H05B 37/00* (2006.01)
(52) U.S. Cl. .................. 315/224; 315/307; 315/DIG. 7
(58) Field of Classification Search ................ 315/224, 315/307, DIG. 7
See application file for complete search history.

(56) References Cited

U.S. PATENT DOCUMENTS 5,747,942 A * 5/1998 Ranganath .................. 315/224

2002/0180378 A1* 12/2002 Griffin et al. ............... 315/224

* cited by examiner

*Primary Examiner*—David H. Vu
(74) *Attorney, Agent, or Firm*—Ostrolenk, Faber, Gerb & Soffen, LLP

(57) ABSTRACT

According to the disclosed embodiment of the invention, a circuit and method for stabilizing an operating characteristic of a compact fluorescent lamp driven by a ballast circuit having an operating frequency controlled by a component value, may comprise a first circuit connected to said ballast circuit for applying the component value thereto; and a second circuit connected to the ballast circuit for changing the component value so as to stabilize the operating characteristic. The operating characteristic may be power, current, voltage or crest factor for example. The second circuit changes the component value in response to a bus voltage of the ballast circuit and includes a switching device such as a transistor responsive to the bus voltage. In the disclosed embodiment the component value is a resistance, the first circuit comprises a first resistor, the second circuit comprises a second resistor, and the switching device selectively connects the second resistor to said ballast circuit in response to the bus voltage exceeding a predetermined threshold.

14 Claims, 4 Drawing Sheets

CFL BALLAST WITH PASSIVE VALLEY FILL AND CREST FACTOR CONTROL

CROSS-REFERENCE TO RELATED APPLICATIONS

This application is based on and claims priority of U.S. Provisional application Ser. No. 60/546,515 filed by the present inventors on Feb. 19, 2004 (IR-2672 Prov), incorporated by reference. It is related to Ser. No. 10/664,676 filed Sep. 18, 2003, entitled ADAPTIVE CFL CONTROL CIRCUIT (IR-2370), also incorporated by reference.

BACKGROUND OF THE INVENTION

1. Field of the Invention

The present invention relates to a CFL (compact fluorescent lamp) ballast with a passive valley fill configuration, and more particularly to such a ballast with an arrangement for limiting crest factor.

2. Related Art

A known CFL ballast circuit is based on a resonant topology driven by a MOSFET half bridge. The CFL ballast circuit may be controlled by the IR2520 Ballast Control IC from International Rectifier Corp., which is described in the above-mentioned Ser. No. 10/664,676 and provides lamp preheat, lamp ignition, running mode and fault protection (lamp fault, open filaments, failure to strike, deactivated lamp and low AC line). Of course, other ballast and control circuits are known as well and the present invention is not limited to the specific examples herein.

In some applications it is desirable to have a regulated and boosted DC bus voltage and a high power factor, but conventional solutions such as an additional inductor, IC or FET can be expensive. For example, in a low-cost CFL below about 25 W, PFC is not often used because of cost, but this causes very high THD, and cannot prevent light output from varying with the AC line voltage.

To achieve a high power factor, a passive valley fill configuration has been used in the input stage. A diode and a resistor have been added to the standard passive valley fill configuration to reduce THD. However, the lamp current intrinsically has a high crest factor in a passive valley fill configuration because of the bus voltage shape. The crest factor is very high because the bus voltage changes between two different values, very different from each other: about VACpk and ½ VACpk. The current at the minimum bus voltage will be more than double the current at the maximum bus voltage and the intrinsic crest factor will be higher than 2. This condition exists in the case of constant frequency. Using a resistor to limit the harmonics increases the crest factor even further, because the minimum bus voltage decreases.

FIG. 1 shows (A) the bus voltage shape, (B) the lamp current shape, and (C) the lamp voltage shape in a circuit with passive valley fill configuration using a 1K resistor to reduce the harmonics.

SUMMARY OF THE INVENTION

To improve this situation, it would be desirable to implement a low-cost CFL ballast which can conform to new regulations, particularly in Asia, namely:

1) Total Harmonic Distortion (THD)<30%
2) Power Factor (PF)>0.85
3) Lamp Current Crest Factor Ipk/Irms (CF)<1.7 220-240 VAC, 14 watts.

To limit the crest factor an additional circuit has been included to modulate the frequency of the half-bridge in response to the DC bus voltage value. The circuit increases the frequency when the DC bus voltage increases above a threshold, thereby limiting the crest factor of the current. FIG. 2 shows the effect of the frequency modulation on the lamp current (B).

According to the disclosed embodiment of the invention, a circuit and method for stabilizing an operating characteristic of a compact fluorescent lamp driven by a ballast circuit having an operating frequency controlled by a component value, may comprise a first circuit connected to said ballast circuit for applying the component value thereto; and a second circuit connected to the ballast circuit for changing the component value so as to stabilize the operating characteristic. The operating characteristic may be power, current, voltage or crest factor for example.

The second circuit changes the component value in response to a bus voltage of the ballast circuit and includes a switching device such as a transistor responsive to the bus voltage. In the disclosed embodiment the component value is a resistance, the first circuit comprises a first resistor, the second circuit comprises a second resistor, and the switching device selectively connects the second resistor to said ballast circuit in response to the bus voltage exceeding a predetermined threshold.

Other features and advantages of the present invention will become apparent from the following description of the invention which refers to the accompanying drawings.

DETAILED DESCRIPTION OF EMBODIMENTS OF THE INVENTION

Figure 1:
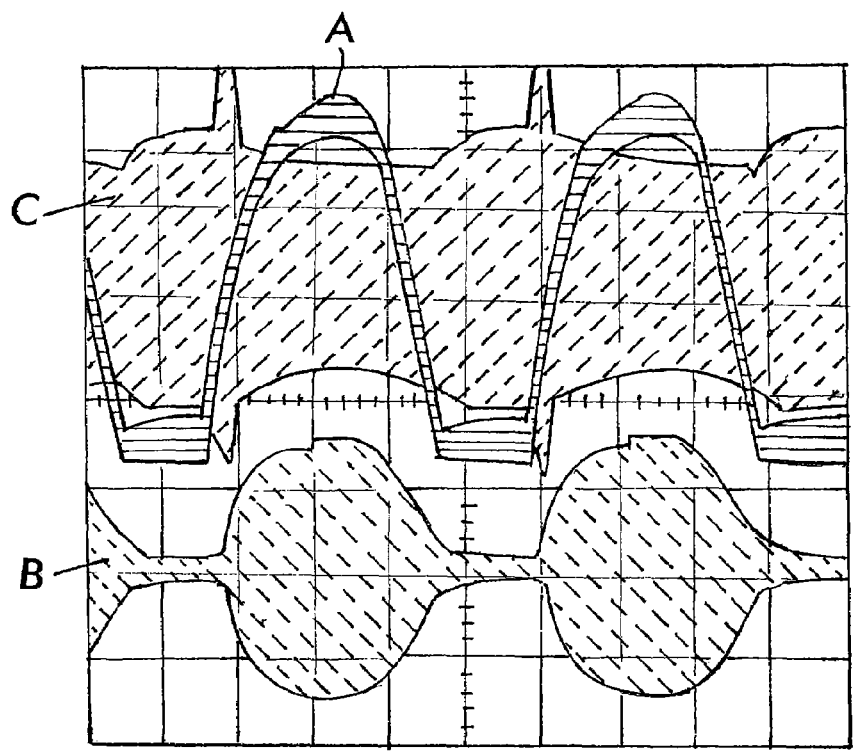
FIG. 1 shows (A) bus voltage, (B) lamp current and (C) lamp voltage in a circuit with a passive valley fill configuration.
Figure 2:
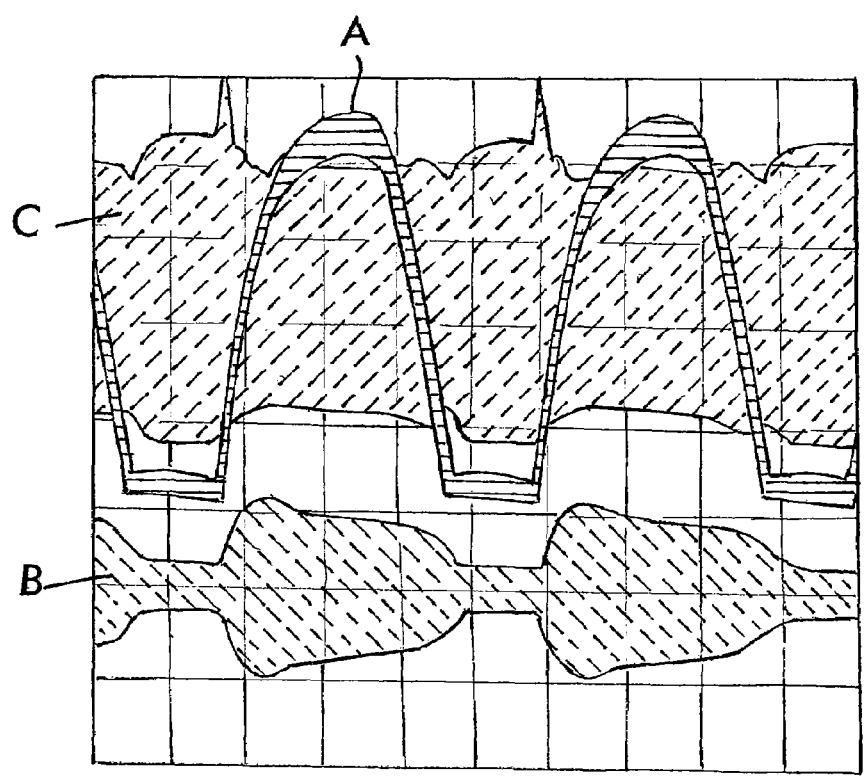
FIG. 2 shows (A) bus voltage, (B) lamp current and (C) lamp voltage in a circuit with a passive valley fill configuration and frequency modulation.
Figure 3:
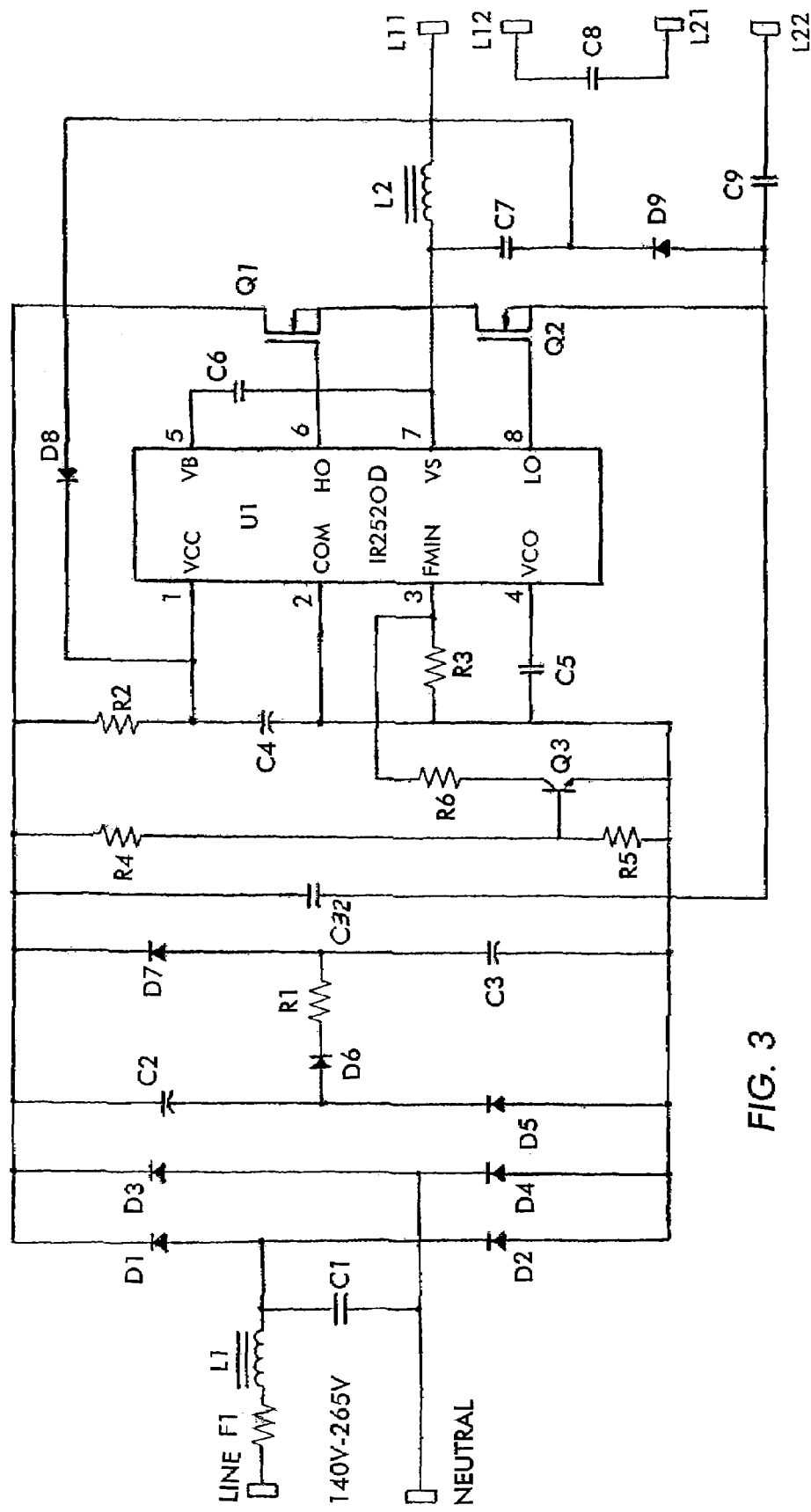
FIG. 3 is a schematic diagram showing a circuit according to an embodiment of the invention.

The circuit of FIG. 3 includes a resonant output stage (C8, L2), rectification (D1, D2, D3, D4), standard EMI filter and input stage (L1, C1, C3A, F1), half bridge (Q1, Q2), ballast control IC IR2520 (U1), accessory circuitry for the IC (C6, C4, R3, C5), charge pump to supply the IR2520 (R2, D9), and snubber cap (C7). A passive valley fill circuit (C2, C3, D6, R1, D5, D7) is provided for low THD. A crest factor control circuit (R4, R5, Q3, R6) is also provided. R3 programs the minimum frequency of the IR2520. During steady state the IR2520 will oscillate at the minimum frequency in case of a zero voltage switching condition. If non-zero voltage switching is detected, the IR2520 frequency will increase automatically until it reaches zero-voltage switching operation. C5 programs the startup time, setting the preheat time.

The crest factor is controlled by improving upon the known constant frequency operation and using two different frequencies: a minimum frequency for lower bus voltage and a higher frequency for greater bus voltage. Providing a higher frequency at the maximum bus voltage will reduce the voltage and current to the lamp, decreasing the maximum value the current will reach.

The crest factor control circuit generates two different frequencies, by adding a resistor R6 in parallel with the resistor R3 when the transistor Q3 is on. The new working frequency of the IR2520 will depend on the combination of the parallel resistors R6 and R3 and will be greater than the frequency determined by R3 alone. The transistor Q3 will turn on when the voltage between base and emitter, which is determined by R5, exceeds the conduction threshold of the transistor Q3.

Summarizing, when the bus is low the IR2520 will oscillate at the minimum frequency, determined by R3. When instead the bus voltage exceeds a certain value (determined by R5 and R4), the IR2520 will oscillate at a higher frequency, determined by the parallel combination of R3 and R6.

Following is a preferred but non-limiting procedure for selecting values for the components in FIG. 3:

1) Select C8 and L2 to have an appropriate preheat on the lamp in the preheat time and an appropriate lamp power at about 40 KHz
2) Select C5 to have an appropriate preheat time Increase C5 to increase the preheat time
3) Select R3 to have an appropriate minimum frequency (fmin), and input power slightly higher than the input power needed (14 W+4 W) Increase R3 to decrease fmin and increase input power
4) R1 reduces the THD and the harmonics related to the passive valley fill configuration:

Start with R1=0 and increase R1 until THD is within spec. Higher R1 will cause lower minimum bus voltage and so higher crest factor of the current and can cause multiple ignitions of the lamp, so R1 should be selected as low as possible.

5) R5 sets the bus voltage threshold value. When the bus voltage exceeds this threshold, the half-bridge frequency will start to increase above fmin Adjust the value of R5 so that the Vbus threshold is selected around (Vbus max–Vbus min)/2

6) R6 sets the maximum frequency when the bus voltage is maximum, determined by the parallel R3 and R6

| | |
|---|---|
| For bus voltage < Bus voltage threshold f(R5) | f = fmin = f(R3) |
| For bus voltage > Bus voltage threshold f(R5) | f = fmax (R3 in parallel with R6) |

In operation, above the bus voltage threshold, there will be a range in which the frequency will be between fmin and fmax.

Start with R6=300K and decrease the frequency to decrease the crest factor. This operation will increase the maximum frequency fmax.

To decrease the crest factor either decrease R6 to increase fmax and so the amount of frequency modulation, or adjust the value of R5. Decreasing the crest factor will decrease the input power (because changing R1 will increase the time at fmax, or changing R6 will keep the same time at a higher fmax). If the power decreases too much R3 can be increased to decrease fmin.

7) Adjust (increase) again the value of R3 to set an appropriate input power. This operation will increase the minimum frequency fmin.

In operation fmin depends also on C8 if non-zero voltage switching occurs, because the IR2520 will work above fmin in the case of non-zero voltage switching. To avoid this C8 can be increased.

8) Increase C8 in case of non-zero voltage switching or to increase the preheat on the lamp if a longer lamp life is needed.

TABLE 1

Test Results

| | Vrms | |
|---|---|---|
| | 220.5 V | 240.2 V |
| Irms | 59.62 mA | 60.85 mA |
| Pin | 12.604 W | 0.95 |
| PF | 0.951 | 13.895 W |
| THD | 28.20% | 29.10% |
| Lamp CF | 1.7 | 1.75 |
| 3rd | 15.86% | 16.84% |
| 5th | 6.68% | 7.75% |
| 7th | 16.92% | 16.99% |
| 9th | 6.79% | 5.96% |

Figure 4:
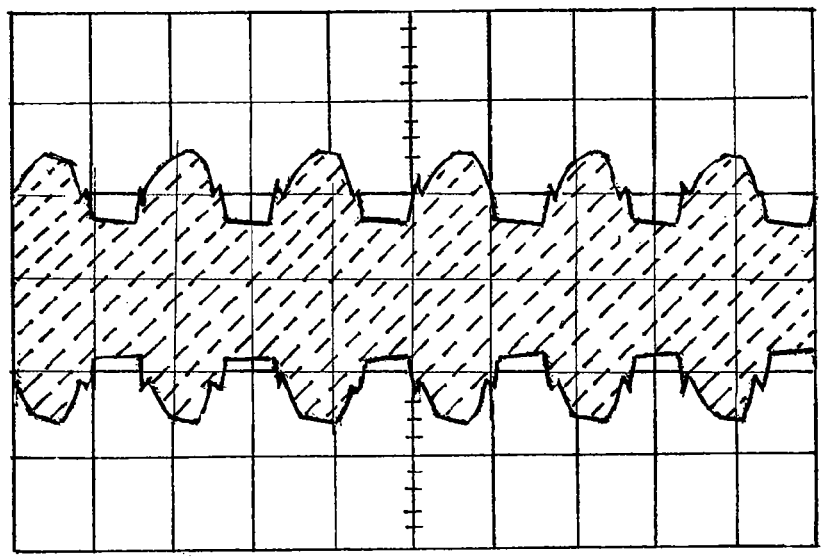
FIG. 4 shows lamp current in the circuit.
Figure 5A:
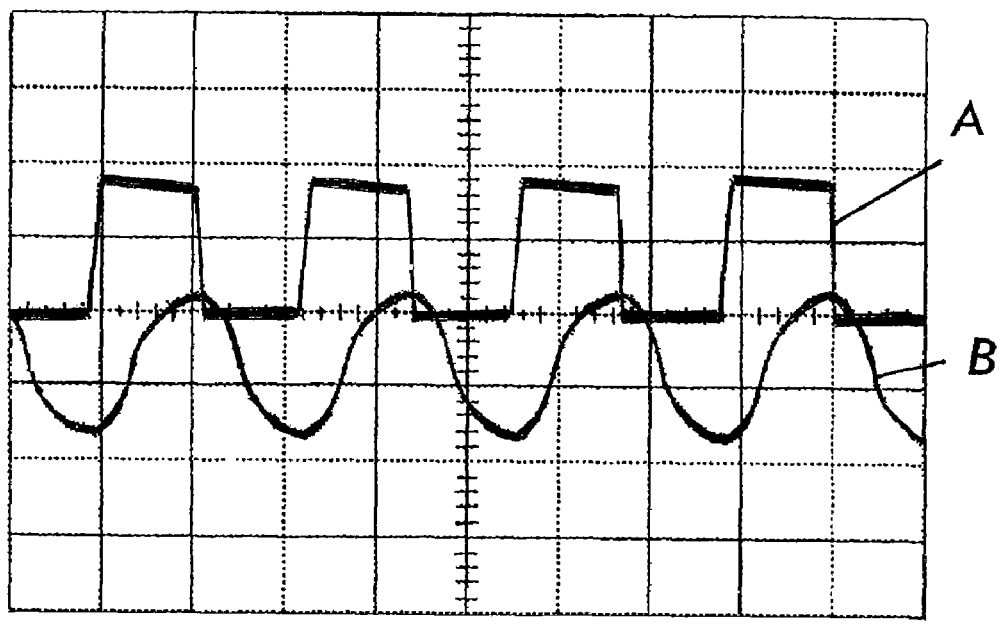
FIG. 5A shows (A) supply voltage VS and (B) lamp current at a minimum frequency fmin (e.g. 43.4292 kHz) for a minimum bus voltage.
Figure 5B:
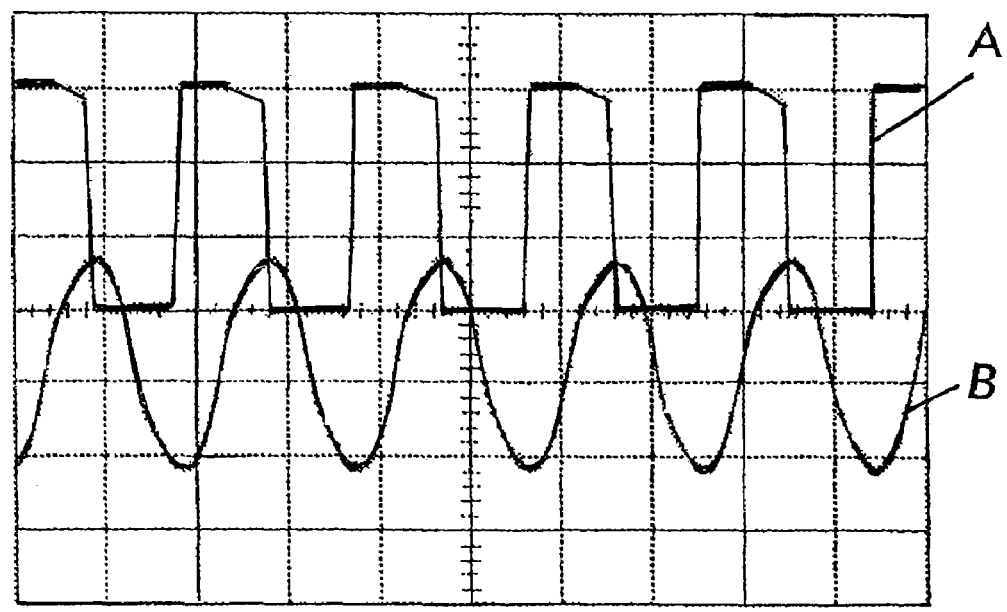
FIG. 5B shows the same values at a maximum frequency fmax (e.g. 52.4672 kHz) for a maximum bus voltage.

FIG. 4 shows the lamp current. Crest Factor=419/121.6=0.7. FIGS. 5A and 5B show the frequency modulation (the VS pin of the R2520 at (A), and the lamp current at (B). The two different frequencies are shown: fmin for minimum bus voltage and fmax for maximum bus voltage.

Figure 6:
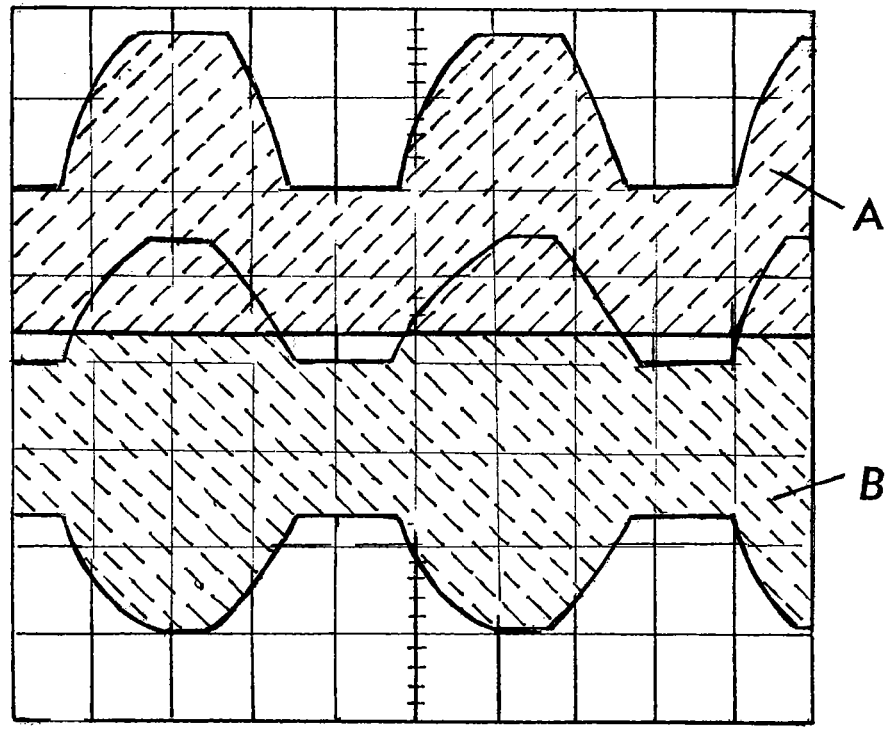
FIG. 6 shows (A) bus voltage and (B) lamp current.

FIG. 6 shows (A) bus voltage and (B) lamp current.

An effective set of component values for the circuit is as follows: R5=1K, R3=76.2K, R6=300K, R1=560 ohms. Crest factor is 1.7 with these values.

It is possible to further improve the crest factor by the following steps:

Step 1) reduce R1 to 500 ohms (this will slightly increase THD).

Step 2) Decrease R6 until an appropriate crest factor is obtained. With 250K crest factor is <1.7 and power is still acceptable (12.3 W).

Step 3) Increase R3 to increase the input power if power becomes too low. If this does not increase power because of non-zero voltage switching (fmin does not decrease), increase C8 (this will also improve the preheat).

The same crest factor control circuit (R6, Q3, R5 and R4) is useful in other circuit arrangements as well, such as a standard IR2520 configuration with bus capacitor and rectification, with the following beneficial results:

1) Stabilizing the lamp power (or current or voltage) in response to bus voltage changes due to AC line changes;
2) Allowing a smaller bus capacitor to be used in every type of CFL circuit; and
3) Reducing EMI through providing a frequency range instead of a constant frequency.

Although the present invention has been described in relation to particular embodiments thereof, many other variations and modifications and other uses will become apparent to those skilled in the art. Therefore, the present invention is not limited by the specific disclosure herein.

What is claimed is:

1. A circuit for controlling a lamp current crest factor in a compact fluorescent lamp driven by a ballast circuit having an operating frequency controlled by a component value, comprising:

a first circuit connected to said ballast circuit for applying said component value thereto; and a second circuit connected to said ballast circuit for changing said component value so as to change said operating frequency and thereby change said lamp current crest factor.

2. The circuit of claim 1, wherein said second circuit changes said component value in response to a bus voltage of said ballast circuit and includes a switching device responsive to said bus voltage.

3. The circuit of claim 2, wherein said component value is a resistance, and said switching device changes said resistance in response to a bus voltage change.

4. The circuit of claim 3, wherein said first circuit comprises a first resistor, said second circuit comprises a second resistor, and said switching device selectively connects said second resistor to said ballast circuit in response to said bus voltage exceeding a predetermined threshold.

5. The circuit of claim 1, wherein said second circuit changes said component value in response to an increase in a bus voltage of said ballast circuit so as to increase said operating frequency and thereby reduce a lamp current.

6. The circuit of claim 1, wherein said second circuit changes said component value in response to a decrease in a bus voltage of said ballast circuit so as to decrease said operating frequency and thereby increase a lamp current.

7. The circuit of claim 1, wherein said circuit controls said lamp current crest factor to a value<1.7.

8. A method for controlling a lamp current crest factor in a compact fluorescent lamp driven by a ballast circuit having an operating frequency controlled by a component value, comprising the steps of:

a step in a first circuit connected to said ballast circuit for applying said component value to said ballast circuit; and a step in a second circuit connected to said ballast circuit, said second circuit changing said component value so as to change said operating frequency and thereby change said lamp current crest factor.

9. The method of claim 8, wherein said second circuit changes said component value in response to a bus voltage of said ballast circuit and includes a switching device responsive to said bus voltage.

10. The method of claim 9, wherein said component value is a resistance, and said switching device changes said resistance in response to a bus voltage change.

11. The method of claim 10, wherein said first circuit comprises a first resistor, said second circuit comprises a second resistor, and said switching device selectively connects said second resistor to said ballast circuit in response to said bus voltage exceeding a predetermined threshold.

12. The method of claim 8, wherein said second circuit changes said component value in response to an increase in a bus voltage of said ballast circuit so as to increase said operating frequency and thereby reduce a lamp current.

13. The method of claim 8, wherein said second circuit changes said component value in response to a decrease in a bus voltage of said ballast circuit so as to decrease said operating frequency and thereby increase a lamp current.

14. The method of claim 8, wherein said method controls said lamp current crest factor to a value<1.7.

* * * * *